United States Patent
Gord et al.

(10) Patent No.: US 6,821,591 B2
(45) Date of Patent: Nov. 23, 2004

(54) SEAMLESS TUBULAR FILM AND METHODS AND DEVICES FOR PRODUCING A SEAMLESS TUBULAR FILM MATERIALS

(75) Inventors: Herbert Gord, Ingelheim (DE); Klaus-Dieter Hammer, Mainz (DE); Rainer Neeff, Wiesbaden (DE); Klaus Berghof, Rudolstadt-Schwarza (DE); Markus Eilers, Rudolstadt-Schwarza (DE); Reinhard Maron, Rudolstadt-Schwarza (DE)

(73) Assignee: Kalle GmbH & Co. KG, Wiesbaden (DE)

(*) Notice: Subject to any disclaimer, the term of this patent is extended or adjusted under 35 U.S.C. 154(b) by 0 days.

(21) Appl. No.: 09/908,793

(22) Filed: Jul. 20, 2001

(65) Prior Publication Data

US 2002/0022100 A1 Feb. 21, 2002

(30) Foreign Application Priority Data

Jul. 22, 2000 (DE) .......................................... 100 35 798

(51) Int. Cl.[7] .................................................. B32B 1/08
(52) U.S. Cl. ...................... 428/36.9; 264/187; 264/203; 264/209.3; 264/559; 264/561; 264/562; 264/563; 428/36.91
(58) Field of Search ............................. 428/36.9, 36.91, 428/34.8; 264/187, 203, 209.3, 559, 561, 562, 563

(56) References Cited

U.S. PATENT DOCUMENTS

| | | | |
|---|---|---|---|
| 2,179,181 A | 11/1939 | Graenacher et al. .......... 106/40 |
| 3,447,939 A | 6/1969 | Johnson et al. ............. 106/155 |
| 3,822,333 A | 7/1974 | Haruta et al. ............... 264/179 |
| 3,898,348 A | 8/1975 | Chiu et al. .................. 426/413 |
| 4,164,536 A | 8/1979 | Bentley ...................... 264/173 |
| 4,246,221 A | 1/1981 | McCorsley, III ............ 264/203 |
| 5,358,765 A | * 10/1994 | Markulin .................... 428/34.8 |
| 5,358,784 A | 10/1994 | Hammer et al. ........... 428/34.8 |
| 5,480,691 A | 1/1996 | Hammer et al. ........... 428/34.8 |
| 6,019,925 A | 2/2000 | Diamantoglou et al. .... 264/203 |
| 6,033,618 A | 3/2000 | Gord et al. ................. 264/559 |
| 6,113,842 A | 9/2000 | Weigel et al. .............. 264/559 |
| 6,200,510 B1 | * 3/2001 | DuCharme et al. ......... 264/132 |

FOREIGN PATENT DOCUMENTS

| | | |
|---|---|---|
| DE | 19607953 A1 | 9/1997 |
| DE | 19750527 A1 | 5/1999 |
| EP | 0180207 A2 | 5/1986 |
| EP | 0635213 A1 | 1/1995 |
| EP | 0807460 A1 | 11/1997 |
| EP | 0899076 A1 | 3/1999 |
| GB | 304754 | 2/1930 |
| GB | 1002752 | 8/1965 |
| WO | WO 93/13670 | 7/1993 |
| WO | WO 95/35340 | 12/1995 |
| WO | WO 96/34037 A1 | 10/1996 |
| WO | WO 97/31970 A1 | 9/1997 |
| WO | WO 98/42492 A2 | 10/1998 |
| WO | WO 00/23249 A2 | 4/2000 |
| WO | WO 00/23250 A1 | 4/2000 |

OTHER PUBLICATIONS

H1592 (Statutory Invention Registration), M. D. Nicholson "Cellulosic Food Casing", published Sep. 03, 1996.*

* cited by examiner

*Primary Examiner*—Sandra M. Nolan
(74) *Attorney, Agent, or Firm*—Connolly Bove Lodge & Hutz LLP (57) ABSTRACT

The present invention provides a seamless tubular film on a cellulose base, being produced by extruding an aqueous cellulose N-methyl-morpholine-N-oxide spinning solution. The maximum degree of roughness $R_{max}$ is from greater than 0.1 µm to 0.5 µm and an average degree of roughness $R_m$ is from 0.005 to 0.014 µm. On the surface of the tubular film is formed in contact with an electrolyte an electrokinetic potential, the size of which depends on the pH value of the electrolyte.

20 Claims, 3 Drawing Sheets

SEAMLESS TUBULAR FILM AND METHODS AND DEVICES FOR PRODUCING A SEAMLESS TUBULAR FILM MATERIALS

BACKGROUND OF THE INVENTION

1. Field of the Invention

The present invention relates generally to methods and devices for producing seamless tubular films having a cellulose base, as well as to cellulose-based seamless tubular films. In particular, the present invention relates to processes of extruding an aqueous cellulose-N-methyl-morpholine-N-oxide (NMMO) spinning solution through an annular die in a spinning bath, whereby the spinning solution is formed into the tubular film, which is drawn laterally, in an air gap between the annular die and the level indicator of the spinning bath, by a supporting burst of excess air pressure in the tubular films.

2. Description of Related Art

The production of cellulosic molded components, especially fibers, films, and tubular films, via a viscose process is widely known in the art, as are problems associated with this process, such as the large number of process stages, and costly measures required for the treatment of waste water and exhaust air. One alternative to the viscose method involves the direct dissolution of cellulose in an organic solvent, and the spinning of such a solution in a spinning bath.

The ability of tertiary amine oxides, under certain conditions, to dissolve cellulose is known for example, from U.S. Pat. No. 2,179,181. The production of solutions using the tertiary amine oxide N-methyl-morpholine-N-oxide (NMMO) and cellulose is described, for example, in U.S. Pat. No. 3,447,939. In U.S. Pat. No. 4,246,221, the production of molded cellulosic components by dissolving cellulose in a mixture of NMMO and water, and spinning such solutions in an aqueous spinning bath is disclosed. Any method of the type described above will hereinafter be referred to as an "amine oxide method." All of these documents are incorporated herein by reference.

In WO 93/13670, incorporated herein by reference, the production of a seamless tubular covering for food via the extrusion of a solution of cellulose in NMMO/$H_2O$ using a special extrusion die is described. Between the extrusion die and the spinning bath is an air gap. A distinguishing feature of this method is a specially formed hollow mandrel, through which the spinning liquid can also circulate inside the tube. In the air gap, the inside of the extruded tube is almost completely filled by the hollow mandrel and the spinning liquid. The tube is not drawn laterally.

In WO 95/35340, incorporated herein by reference, a method for producing blown cellulose films is described, that employs cellulose that is not dissolved in amine oxides, and not derivatized. The spinning solution is extruded downward through an annular die, through an air gap, in a spinning bath, wherein the tube is filled with a liquid, while at the same time an air gap is established inside the tube by varying the internal bath column. The tube is blown using a propellant or the air that is enclosed inside the tube between the inner bath and the die, whereby an intended orientation of the film may be established, thus allowing increased stability, especially in a crosswise direction, to be obtained.

It is considered particularly disadvantageous relates to the extrusion of a tubular film from an annular die in a spinning bath, wherein no mechanical support of the tubular film is provided inside the spinning bath. This is because the sizing precision of the tubular film cannot be maintained when it is filled with an inner bath solution, which in turn results in irregular variations in the diameter of the tube. This is caused by variations in pressure in the inner air gap that is enclosed between the die and the inner bath level indicator, resulting from variations in the inner bath column caused by exchanges between the tube containing the NMMO and the spinning medium. It is furthermore considered disadvantageous that during the course of the spinning process, the exchanges between the tube containing the NMMO and the spinning medium, result in a constant change in the concentration of NMMO in the inner spinning solution. Since that the spinning conditions are constantly changing, constant film structure and constant film properties are difficult to obtain.

In contrast, in EP-A 0 899 076, incorporated herein by reference, a method and a device are described, whereby a seamless tubular film having a cellulose base can be produced from a solution of cellulose in NMMO/$H_2O$, which does not typically possess the above-named disadvantages. By using spatially separate inlet and outlet pathways for the spinning bath into the inside of the tube, a constant inner bath level and a constant inner bath concentration are established, so that tubular films having a constant size and constant structure can be produced. In order to obtain improved mechanical properties, the tube is drawn laterally in the air gap via the regular introduction of compressed air into the inside of the tube, while a constant internal pressure is continually maintained.

DE-A 196 07 953, incorporated herein by reference, describes the production and use of seamless tubular films having a cellulose base as sausage casings, which are produced by extruding a spinning solution composed of cellulose, NMMO, and water through an annular die and an air gap in a spinning bath.

Methods for producing spinning solutions composed of cellulose, NMMO, and $H_2O$ are generally known. In accordance with the state of the art, in the amine oxide method, a spinnable solution is obtained from a suspension composed of cellulose and aqueous NMMO, which in the concentration used and at the applied temperature represents a non-solvent for the cellulose, at increased temperature and shear by removing water under a vacuum until an NMMO concentration is reached that corresponds essentially to the monohydrate concentration of the NMMO, by dissolving the cellulose. In this, the spinning solution may contain an amount of cellulose that is between 5 and 20% by weight, preferably between 7 and 15% by weight, based upon the total weight of the spinning solution. Other naturally occurring and/or hydrophilic synthetic polymers, and polymers that possess both hydrophilic and hydrophobic properties may be contained in the spinning solution. (See, i.e. DE-A 196 07 953 which is incorporated herein by reference).

In order for such cellulosic tubular films to be used as sausage casings, it is desirable and often necessary, that in addition to a precise, constant size, that the sausage casings be easily peelable after use, without their contents (the sausage) becoming damaged. Consistency in size, or a uniform circumference with no kinks, folds, etc., are also often a prerequisite for problem-free filling of the casings, and subsequently for the uniformity of the sausages as final products in terms of their dimensions and surface quality. The ease in peeling the sausage casings can be improved via a special impregnation of the insides of the casings. These so-called "easy-peel" inner preparations can be applied either during the drying process or during filling, via an inner filling die. These methods have already been described, for example in U.S. Pat. No. 3,898,348, EP-A 0 180 207, EP-A 0 635 213, and U.S. Pat. No. 5,358,784, all of which are incorporated herein by reference. An improvement in the ease of peeling either without the "easy-peel preparation" or using smaller quantities of the preparation (and the associated lower production costs) may also be achieved, however, by obtaining the most uniform and smooth inner surface structure possible. As a measurement of the "smoothness" of the inner surface of the tubular film, its degree of roughness may be used, which can be determined using a perthometer.

The perthometer is an electrical measuring device designed to produce profile recordings, measured data displays, and logging of measurements of technical surfaces. A measuring pin uses a vertically movable tip to sense the shape of the surface along the section to be measured. Movements in the pin tip are transmitted to an electronic data converter, which converts them to electronic data that represent the sensed profile. In accordance with DIN-Norm 4766, different characteristic roughness values $R_a$, $R_z$, $R_{max}$ can be identified. The arithmetic average roughness $R_a$ is the arithmetic average of the absolute values of the profile deviations along a reference section $1$. It is equal to the height of a rectangle, the length of which is equal to the reference section $1$, and which is equal in area to the sum of the surface area that lies between the roughness profile and the center line. Usually, the $R_a$ value is established within a total section $1_m$, which is composed of five individual sections $1_e$ lined up in a row, one after the other. The average degree of roughness $R_2$ is the arithmetic average of the individual roughness degrees of five adjacent individual measurement sections. The maximum degree of roughness $R_{max}$ is the magnitude of the individual degrees of roughness occurring over the entire measurement section $1_m$.

From EP-A 0 807 460 and DE-A 197 50 527 (which are incorporated herein by reference in their entireties) it is known that spinning solutions comprising of cellulose and/or modified cellulose, a tertiary amine oxide, and other fluids and additives such as stabilizers, pore builders, etc. can be spun to form cellulosic separating membranes in the form of flat, tubular, or hollow fiber membranes. In this, the structure and thus the separating power of the membrane is influenced to a large degree by the spinning medium and/or by the composition of the spinning medium, by the spinning bath temperature and the concentration of the cellulosic polymer in the spinning solution. Similar statements regarding influences to the structure of blown films produced via the amine oxide process are also published in "Das Papier" December 1997, pages 643 through 652, which is incorporated herein by reference.

SUMMARY OF THE INVENTION

An object of the present invention is to improve upon prior methods so that a seamless cellulosic tubular film of generally constant size and that is substantially free from defects in terms of undesirable folds, and possessing a uniformly low degree of surface roughness on the inside surface of the tubular film, can be obtained.

The present invention that also possesses provides a method for producing a seamless tubular film based on cellulose comprising extruding an aqueous cellulose-N-methyl-morpholine-N-oxide (NMMO) spinning solution through an annular die in a spinning bath, wherein the spinning solution forms the tubular film. The film is laterally drawn in an air gap between the annular die and the spinning bath by stabilizing air pressure in the tubular film. The level of hydrostatic pressure from an inner spinning solution formed inside the tubular film extends above the spinning bath, the inner spinning solution comprising an aqueous NMMO solution that supports and intensifies said lateral drawing. The tubular film that has been expanded by the lateral drawing process is passes by a turning point in the spinning bath, and directed out of the spinning bath.

The present invention is further directed to devices that are useful in preparing tubular films as well as to tubular films, per se.

In accordance with the invention, objects of the invention can be attained in that the hydrostatic pressure from an inner spinning solution comprising of an aqueous NMMO solution, which is above the level of the spinning bath and is inside the tubular film, supports and intensifies lateral stretching of the film, and further in that the tubular film that is extended by the lateral stretching passes a turning point in the spinning bath after which it is directed out of the spinning bath.

Additional objects, features and advantages of the invention will be set forth in the description which follows, and in part, will be obvious from the description, or may be learned by practice of the invention. The objects, features and advantages of the invention may be realized and obtained by means of the instrumentalities and combination particularly pointed out in the appended claims.

BRIEF DESCRIPTION OF THE DRAWINGS

The accompanying drawings, which are incorporated in and constitute a part of the specification, illustrate a presently preferred embodiment of the invention, and, together with the general description given above and the detailed description of the preferred embodiment given below, serve to explain the principles of the invention.

Below, the invention will be described in greater detail using the exemplary embodiment illustrated in the diagrams.

DETAILED DESCRIPTION OF A PREFERRED EMBODIMENT

Figure 1:
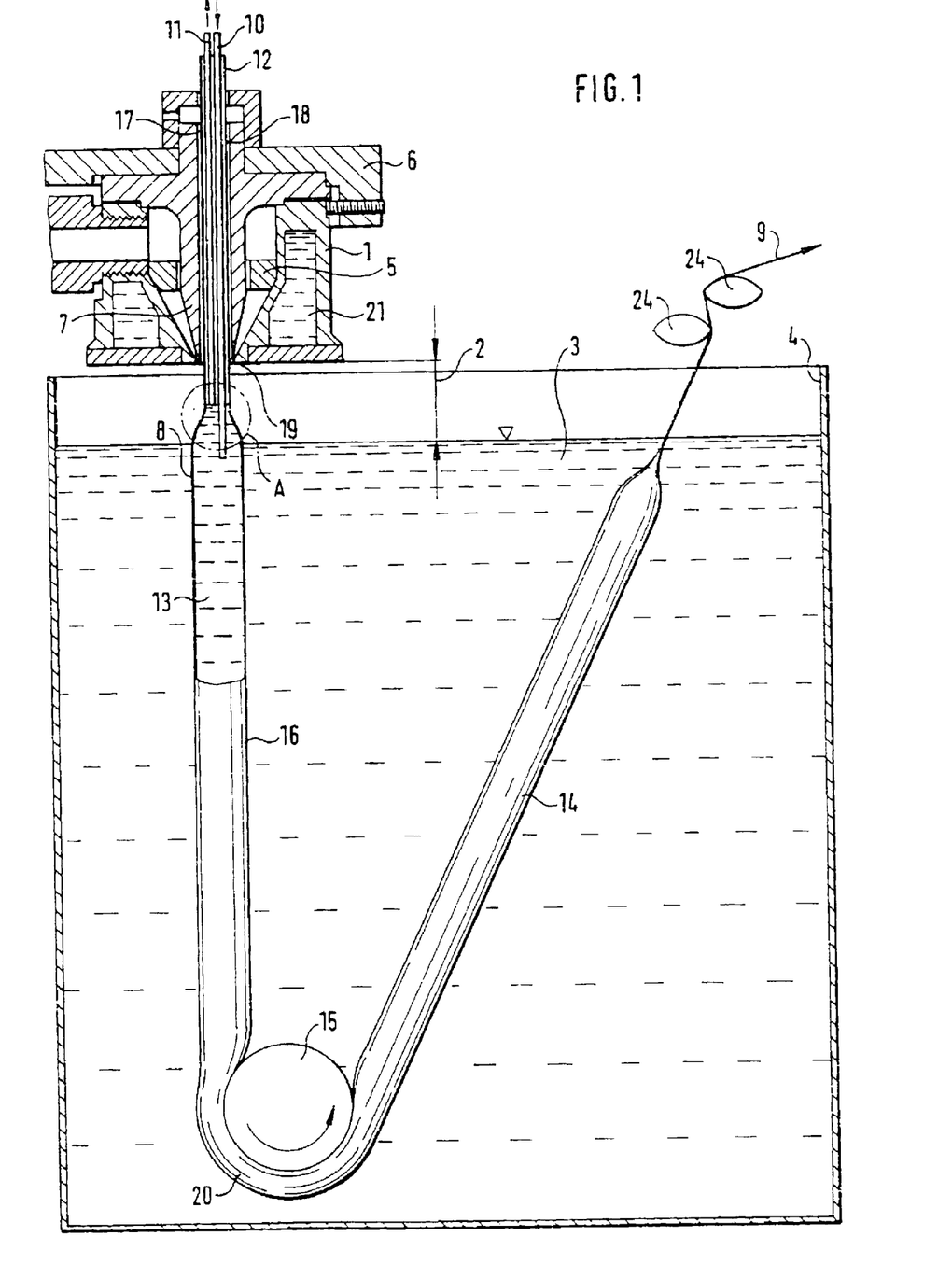
FIG. 1 is a schematic sectional view of a device according to the present invention, with a pipe positioned in the air gap, and an outlet tube in the tubular film, and with an inlet tube in an upward position.

In accordance with the present invention, a seamless tubular film having a cellulose base can be produced by extruding an aqueous cellulose NMMO spinning solution through an annular die 1 in a spinning vat 4, in which a spinning bath is held. The tubular film 16 which is immersed in the spinning bath 3 traverses an air gap 2 between the annular die 1 and the level of the spinning bath 3, and is acted upon in the air gap by a stabilizing burst of excess air pressure in the tubular film, causing it to be laterally drawn. An additional level of hydrostatic pressure exerted by an inner spinning solution 13, which extends above the level of the spinning bath 3 and is found inside the tubular film 16, supports and intensifies the lateral drawing. The inner spinning solution 13 is introduced into the tubular film 16 through an inlet tube 10. The tubular film 16 is directed, free from folds and flaws, without being pressed flat, around a turning point 18 near the base of the spinning vat 4, after which it is directed upward out of the spinning bath at an angle of 10 to 80° from horizontal.

The cellulose content of the instant tubular film can be from 58 to 72% by weight, advantageously from 60 to 64% by weight. Thus by "cellulose based" as used herein, a content of cellulose from 58 to 72 based on the weight of the film is intended, whereby the film contains cellulose, water, glycerin and additives. It is important to note that any cellulose or modified cellulose as known in the art, can be included as the cellulose based in the present film. The aqueous cellulose NMMO solution preferably includes from 6,5 to 13,1% by weight cellulose, from 78 to 87% by weight NMMO and 6,5 to 8,9% by weight water, all based on the total weight of the solution.

In an embodiment of the present process, water-soluble compounds that modify the surface structure of the tubular film, and that are present in 1 to 100% by weight in relation to the NMMO share, are added to the inner spinning solution. Preferably, synthetic polymers and copolymers of acrylic acid esters with acrylic acid, methacrylic acid esters with methacrylic acid, maleic acid esters with maleic acid and acrylic-methacrylamide, and vinyl alcohol are used as the modifying compounds. Further, the modifying compounds may be chosen from the group of citric acid, ascorbic acid, maltodextrins, sorbitol, manose, glucose, phosphonate salts, inorganic salts, and gallic acid ester.

In another embodiment of the process, the same aqueous NMMO solution is used for both the spinning bath and the inner spinning solution, containing 5 to 50% by weight, preferably 15 to 35% by weight NMMO.

In yet another embodiment of the invention, the drawing of the tubular film, which is determined by the ratio of the discharge velocity of the spinning solution from the spinning die to the discharge rate of the tubular film, is selected such that the lateral drawing of the diameter of the tube is up to 30%, relative to the undrawn diameter immediately after the tube exits the spinning die.

A seamless tubular film having a cellulose base according to the present invention that is produced by extruding an aqueous cellulose NMMO spinning solution, preferably possesses a maximum roughness $R_{max}$ that is greater than 0.1 to 0.5 $\mu$m and an average roughness $R_m$ of 0.005 to 0.014 $\mu$m, and also provided with an easy-peel preparation. Note that the amount of easy-peel preparation used can be generally reduced with decreasing roughness of the film.

In another embodiment of the present invention, there is provided a seamless tubular film, wherein the average degree of polymerization (DP) of the cellulose is 300 to 700, preferably 400 to 650 determined in cuprammonium. In a further embodiment of the tubular film, an electrical charge density develops on the surface of the tubular film, in contact with an electrolyte, and corresponds to an electrokinetic potential, the zeta-potential, that preferably ranges from −15 to −25 mV if the pH value of the electrolyte is between 6 and 10.5, and preferably ranges from +5 to −15 mV if the pH value of the electrolyte is between 3.5 and 5.5.

A suitable device that can be used in producing a seamless tubular film having a cellulose base via extrusion of an aqueous cellulose N-methyl-morpholine-N-oxide (NMMO) spinning solution preferably includes an annular die, a spinning bath, an air gap between the annular die and the surface of the spinning bath, and near the base of a spinning vat a turning point for the tubular film. The device preferably also includes an outlet tube for an inner spinning solution positioned inside a pipe, wherein the diameter of the pipe is smaller than that of the tubular film and such that the pipe can be immersed in the inner spinning solution. The extraction opening of the outlet tube can be positioned an adjustable distance above the level of the inner spinning solution inside the tubular film.

In a further embodiment on the device, an inlet tube can be positioned in the pipe such that the pipe extends through the center of a sleeve in the annular die, forming an opening with a central passage in the sleeve. It is also possible for the height of the inlet tube to be adjustable if desired.

One embodiment of the device provides that the surface level of the inner spinning solution in the pipe is above the surface level of the spinning bath, and that the surface level of the inner spinning solution is positioned in the air gap formed between the annular die and the level of the spinning bath.

A device for extruding an aqueous cellulose-(NMMO) solution to form a tubular film, as exemplified, for example, in FIG. 1, comprises an annular die 1 and a spinning vat 4, which is filled with a spinning or precipitation bath 3. The spinning bath 3 is composed of an aqueous NMMO solution containing 5 to 50% by weight, preferably 15 to 35% by weight, NMMO. The components generally included in the known-in-the-art annular die 1 are a primary distributing plate 5, an adjustment device 6, a sleeve 7 having a central opening 18, and an extrusion die opening 19. The aqueous spinning solution to be extruded to form a tubular film is preferably an NMMO solution containing 50 to 95% by weight, preferably 70 to 80% by weight NMMO, and 5 to 15% by weight, preferably 7 to 12% by weight, cellulose. The average degree of polymerization for the cellulose is 300 to 700, most preferably 400 to 650 determined in cuprammonium. The spinning solution is introduced into the annular die 1 via a spinning pump that is not illustrated here. The primary distributing plate in the annular die 1 ensures an essentially even introduction of the spinning solution around the circumference of the extrusion die opening 19. The diameter of the extrusion die opening 19, which is an annular passage, is greater than the outer diameter of the pipe 12. The extrusion die opening is generally 0.1 to 3 mm, preferably 0.2 to 1.5 mm, wide. The precise selection of the thickness of the tubular film is accomplished using the adjustment device 6 on the sleeve 7. The annular die 1 is equipped with a double shell for heating the annular die 1 to the temperature of the spinning solution; a heating medium 21 is provided for this purpose and flows through the double shell. The temperature can range from 75 to 120° C. The drawing of the tubular film in a lengthwise direction in an air gap is achieved in that the discharge rate of the tubular film is greater than the discharge velocity of the spinning solution. The ratio of the drawing rate to the discharge velocity gives the lengthwise extension. The tubular film that is extruded from the die opening 19 traverses this outer air gap 2 between the point of exit from the die and the surface of the spinning bath, in that it is drawn longitudinally and laterally. The lateral drawing is accomplished primarily as a result of the stabilizing air pressure present inside the tubular film, which is greater than the outer atmospheric pressure, and/or secondarily as a result of the hydrostatic pressure from the inner bath, which exceeds the level of the outer bath, in other words the level 22. This lateral drawing serves to substantially increase the lateral stability of the tube. The lateral drawing of the diameter of the tube, based upon the level of stabilizing air pressure and/or hydrostatic pressure, amounts to 0 to 30% in relation to the diameter of the undrawn tube immediately after it exits the die opening 19.

The expanded tubular film 8 does not come in contact with the outer surface of a pipe 12, which protrudes through the central opening 18 in the sleeve 7, and extends downward beyond the underside of the annular die. The lower end of the pipe 12 is positioned above the inner spinning solution. The air gap 2 measures 10 to 100 mm. The pipe 12 comprises an inlet tube 10 and an outlet tube 11 for the inner spinning solution 13, which is piped into the tubular film. This inner spinning solution 13 is also composed of an aqueous NMMO solution containing 5 to 50% by weight, preferably 15 to 35% by weight NMMO, and may also contain other water-soluble polymers that affect the structure of the tube, in a share of 1 to 100% by weight based upon the quantity of NMMO.

These polymers are, for example, synthetic homo- and/or copolymers of acrylic acid esters, methacrylic acid esters, and/or maleic acid esters with acrylic acid, methacrylic acid, and/or maleic acid. They may also contain acrylamide, methacrylamide, and/or vinyl alcohol. Further, they may contain one or more organic, low-molecular compounds from the group of fatty acids, fatty acid esters, or fatty amines and fatty alcohols. Other additives include one or more compounds from the group of gallic acid ester, phosphonate salts, citric acid, ascorbic acid, manose, sorbitol, maltodextrin, glycerin, ethylene glycol, etc., or inorganic salts. In order to improve the suppleness of the tubular film, modifying compounds are added to the spinning solution. These compounds must be miscible with the aqueous cellulose NMMO spinning solution. The share of these compounds generally amounts to 0.2 to 50% by weight, and preferably 0.5 to 20% by weight, always based upon the total weight of the cellulose. Preferably, the share of these modifying compounds is 1 to 15% by weight. These compounds can be homogeneously mixed together with the spinning solution at a temperature of 85 to 105° C., preferably 90 to 100° C. Compounds that are particularly well suited for modifying the internal structure of the tubular film are starches, cellulose, starch and cellulose derivatives such as esters or ethers of the starches or cellulose, sugar esters, and other hydrophilic, naturally occurring polymers such as alginic acid, alginates, chitosan, and carrageenan. One preferred hydrophilic synthetic polymer is vinyl alcohol. Polyvinyl pyrrolidone, copolymers of vinyl pyrrolidone and (2-)dimethylamino-ethyl-methacrylate, copolymers of methylvinyl ether and maleic acid anhydride, or of methylvinyl ether and maleic acid monoalkyl esters may also be used.

In the surface-altering additives to the spinning solution it must be noted that in the production of the solution, the additives will be exposed to temperatures of 85 to 100° C. They must therefore be resistant to heat, and when the excess water is distilled off they must not also be removed. Particularly well suited additives are beeswax, carboxymethyl starches, cellulose carbamate, gelatins, xanthan, carboxymethylcellulose, glycerin-monolaurate, Na-caseinate, and cellulose acetate.

Also suitable for use are ethoxylated fatty acids or their salts such as stearic acid or calcium stearate, waxes, and paraffins.

The surface-altering additives are generally organic polymers. These may be naturally occurring polymers, derivatives of such naturally occurring polymers, or synthetic polymers. Particularly well suited are proteins (such as gelatins, casein, wheat protein, soy protein), protein derivatives (for example a gelatin derived from conversion with stearoyl chloride, or sodium or potassium caseinate), derivatives of mono-, di-, or oligosaccharides, especially esters from sugar and fatty acids (such as esters of sucrose and straight-chain, saturated or unsaturated ($C_{12}$–$C_{24}$) fatty acids), mono-, di-, and triglycerides (such as glycerin monolaurate, which also possesses fungicidal properties), diketenes with generally straight-chain, saturated ($C_{14}$–$C_{20}$) alkyl residues (available, for example, under the brand name ®Aquapel), waxes (such as beeswax, montan wax, or carnauba wax), and/or paraffins. It is also possible to use a number of the above-named additives in conjunction with one another. Proteins and polyamides especially effect an improvement in stability during roasting.

The modified compounds may also be cross-linkable, as is the case with polyethylene imines. In general, these compounds increase the suppleness, strength, and clipping and cutting stability of the tubular film. In addition, they work as internal or primary plasticizers. When these are used, under certain circumstances, impregnation with secondary plasticizers such as glycerin can be entirely omitted, if the share of modifying compounds used is large enough, in other words generally on a magnitude of 8% by weight or more, based upon the weight of the dry cellulose. Modifying compounds of this type also generally reduce the tendency of the cellulose to crystallize.

Figure 2:
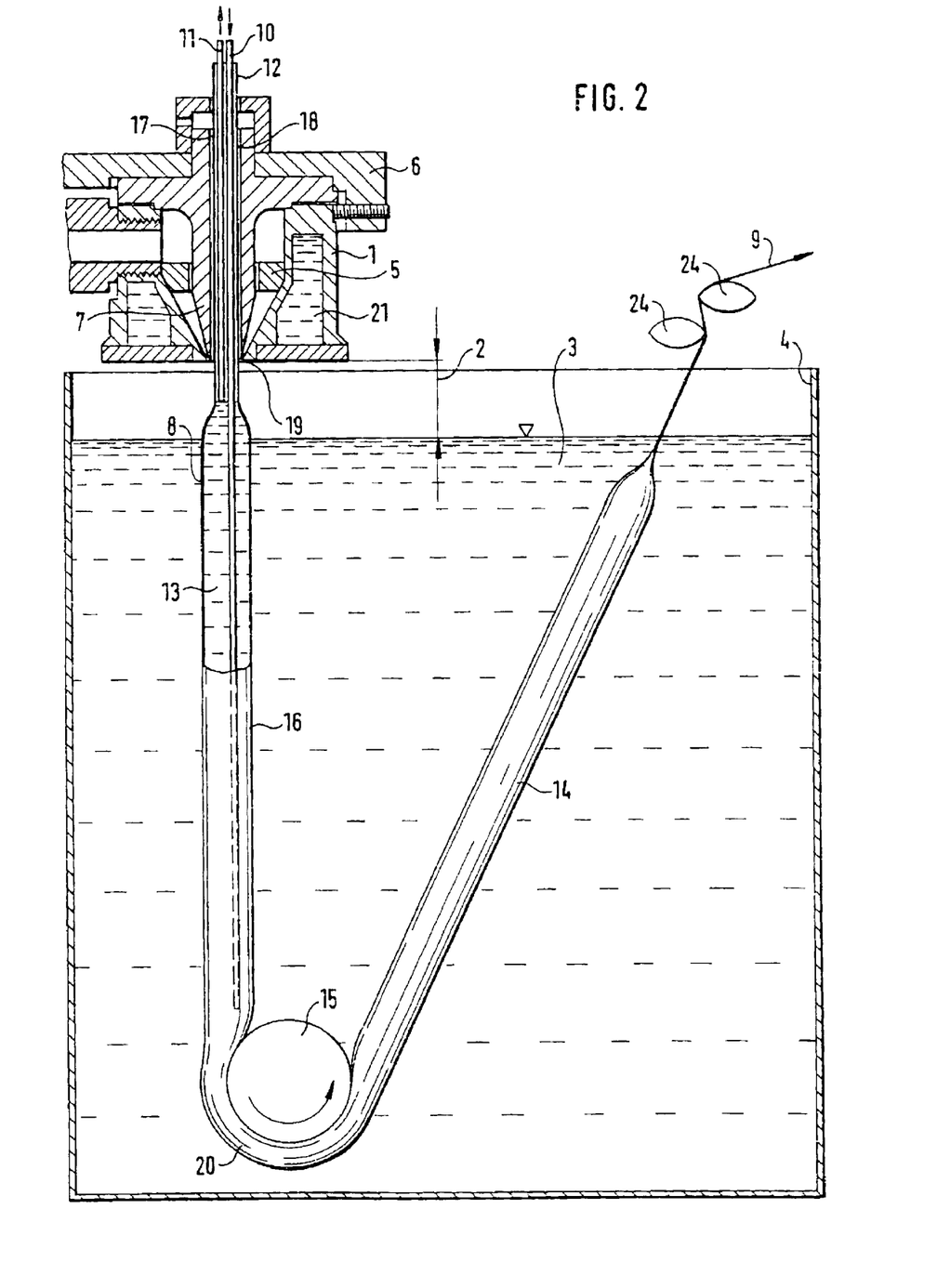
FIG. 2 is a schematic sectional view of a device, similar to the one in FIG. 1, but with the inlet tube inserted into the tubular film.

The inlet tube 10 and the outlet tube 11 extend inside the tubular film 16, which is immersed, perpendicular, in the spinning bath 3. At the start of introduction of the inner spinning solution 13 into the tubular film 16, the inlet tube 10 is in its upper position, as is shown in FIG. 1. The outlet tube 11 is fixed in a position that is above the spinning bath 3. This serves to ensure that the surface of the inner bath 23 will remain above the level of the spinning bath 3. Because the tubular film 16 traverses the spinning bath in its expanded state, the higher lateral orientation that is achieved by lateral drawing is fixed. The tubular film 16 passes the turning point 15 in its expanded state, thus reducing the risk that flaws and folds will form at the turning point to zero. As soon as the tubular film is filled with the inner bath solution, the inlet tube 10 is inserted to a position in the tubular film 16 just above the turning point 15 for the tubular film 16, as is shown in FIG. 2. The height of the inlet tube 10 and the outlet tube 11 can be adjusted within the tubular film 16 that is immersed perpendicularly. The pipe 12 forms an opening 17 with the wall of the central opening 18; through this opening 17 the equalization of pressure between the air that is in an inner air passage 17 between the pipe 12 and the tubular film, and the surrounding air is accomplished.

After passing the turning point 15, which is composed of a porcelain or glass rod, the tubular film 16, which has been laterally drawn and expanded as described, is directed upward through and out of the spinning bath 3, at an angle of 10 to 80° from horizontal. The tubular film 14 that is now traveling upward is squeezed together just below the surface of the spinning bath by the internal pressure of the spinning bath, and is drawn out of the spinning bath 3 in its collapsed state. Rollers 24 on both sides of the collapsed tubular film 14 strip off the excess spinning bath solution on both sides, and the width of the flattened tubular film 9 after passing through the rollers near the point of exit from the spinning vat 4 is used as the regulating variable for the height of the internal bath column. Any deviation in the width of the flattened tubular film 9 from a preset value effects an adjustment in the height of the inner bath column, such that if the deviation is downward, the inner bath level 23 is raised, and if the deviation is upward, the inner bath level 23 is lowered.

FIG. 2 shows the position of the inlet tube following spinning. At this point the inlet tube is positioned with an opening just above the turning point 15, in contrast with FIG. 1. The spinning bath 3 and the inner spinning solution 13 are composed of aqueous NMMO solutions. The inner spinning solution may also contain additional water-soluble polymers that affect the structure of the film, in order to obtain the smoothest possible inner surface for the tubular film 16. During the course of the spinning process, first the concentration of NMMO in the inner bath solution is increased, because the NMMO diffuses out of the tubular film 16 and becomes enriched in the inner spinning solution. Because the NMMO is denser than $H_2O$, the NMMO concentration, or the density of the inner bath solution, increases inside the tubular film 16 as it moves in the direction of the turning point 15. Because the NMMO concentration of the spinning bath 3 does not change significantly, since the quantity of NMMO given off by the tubular film into the spinning bath is negligible due to the great difference in volume between the tubular film and the spinning bath, which is not the case with the inner bath solution in the tubular film 16, without regulation of the NMMO concentration of the inner bath solution a hyperextension of the tubular film 16 could result. Via the continuous supply and removal of the inner bath solution through the inlet and outlet tubes 11, the inner bath solution is constantly renewed and the desired NMMO concentration adjusted, so that the NMMO concentration of the inner spinning solution 13 can be held to the required value as consistently as possible. The necessary NMMO concentration of the inner spinning solution 13 is dependent upon the desired surface structure on the inside of the tube. In order to affect the surface structure of the inside of the tube, in other words to obtain the smoothest surface possible, priority must be given to adjusting the NMMO concentration and the temperature, however technicians may also consider adding water-soluble polymers that will affect structure.

The height of the inner bath column is based upon the spinning draw. Technicians should adjust the lateral draw of the tubular film in the air gap 2 to agree with the lengthwise extension of the tubular film via the drawing in the air gap 2, in order to obtain the most balanced level of stability for the tubular film possible, in both a lengthwise and a lateral direction. Depending upon the density of the inner spinning solution and the height of the inner bath column, technicians should set the density of the spinning bath 3 in terms of the NMMO concentration such that the negative aspects of excessive expansion as listed above will not occur. This is achieved in that the tubular film 16 that is drawn in the air gap 2 traverses the spinning bath 3 up to the turning point with a constant diameter, wherein the lateral drawing that is achieved in the air gap is fixed, and no fluctuations in size occur. Furthermore, this method of procedure ensures that the tubular film 16 is turned on the turning point 15 in its expanded state, hence the risk of flaws or folds forming at that point is substantially minimized or entirely excluded, thus clearly increasing the quality of the tubular film.

The tubular films are provided on the inner and/or outer surfaces with an impregnation or coating 10, such as an inner easy-peel preparation, a liquid smoke impregnation, or some other preparation intended to increase the stability of the chain that will be produced when the tubular films are filled. The impregnation of the inner surfaces of the tubular films is achieved preferably prior to drying or during the filling process via the filling mandrel. The cellulose of the tubular films has an average degree of polymerization DP of 300 to 700, preferably 400 to 650.

Suitable easy-peel preparations that may be applied to the inside of a tubular film that has been plasticized with glycerin are composed of 1 to 2% by weight carboxymethylcellulose, 0.5 to 1% by weight sorbitoltrioleate based upon carboxymethylcellulose, 0.5 to 1% by weight a mixture of mono- and diglycerides, and the remainder water. These easy-peel preparations are applied, for example, using a so-called "bubble coating" process, or are sprayed on during the filling process. This impregnation serves to facilitate the later peeling process. In place of an easy-peel preparation, a liquid smoke preparation may also be used, which is composed of 35 to 39% by weight liquid smoke, 1 to 10% by weight lecithin, 3 to 5% by weight of one or more components from the group NaOH, 1.5 to 2% by weight alginate, 2 to 3% by weight polyethylene glycol monoalkyl ether (Genapol®), 1 to 2% by weight chromic fatty acid complex (Montacell®) with $C_{14}$–$C_{18}$ alkyl residues, and the remainder water. This aqueous liquid smoke preparation is sprayed onto the inner surface of the tubular film. The impregnation provides the tubular film with a smoky aroma as well as an easy-peel effect, which ensures that the tubular film of the sausage casing will be easy to peel off.

The tubular films obtained via the NMMO process exhibit a considerably higher density and greater smoothness or lower degree of surface roughness in comparison with tubular films produced using the viscose method. This results in a higher stability of the tubular films, or makes it possible to reduce the wall thickness of the tubular films in comparison with tubular films produced using the viscose method, while maintaining the same level of stability. Finally, the smooth inner surface makes it easier to peel the tubular films. Furthermore, such degrees of smoothness for the tubular films can be achieved that the preparations that are ordinarily applied to the inner surfaces of the tubular films, such as easy-peel preparations, can be reduced or even omitted entirely. Information regarding the quality and properties of the surface of the tubular films is supplied by measuring the electrokinetic potential, the so-called zeta-potential, of the tubular films. This measurement describes the charge ratios on the surface between the tubular films and a passing electrolyte, particularly the way in which the pH value of the electrolyte affects the surface of the film. This results in an electrical charge on the surface of the tube, which is generated by the dissociation of functional groups of polymers on the surface of the film, or by the specific adsorption of ions from electrolytic solutions. The resulting polarity of the polymeric material of the shell or the tubular film is responsible for the formation of an electric double-charge layer. The potential of this electric double-charge layer cannot be directly measured; instead, the zeta-potential is determined and is used to characterize the electrical properties. The zeta-potential builds up as soon as the surface of the film or tubular film containing the dissociative groups and an electrolyte solution begin to move tangentially toward one another. The zeta-potential corresponds to the net charge density of the film surface. The Helmholtz-Smoluchowski equation for describing the zeta-potential is:

$$\zeta = \frac{4\pi\eta\kappa E_s}{\varepsilon_o D \Delta P}$$

wherein $\zeta$ represents the zeta-potential [V],
$E_s$ represents the streaming potential [V],
$\kappa$ represents the specific conductivity [$\Omega^{-1}\cdot cm^{-1}$],
$\eta$ represents the dynamic viscosity [Pa·s],
$\epsilon_o$ represents the electric constant [$C\cdot V^{-1}\cdot cm^{-1}$], ΔP represents the pressure difference [Pa] and
D represents the dielectric constant.

In tubular films produced using the NMMO method, the zeta-potential measures approximately –15 to –25 mV if the pH value of the electrolytes is between 6 and 10.5, and measures +5 to –15 mV if the pH value of the electrolytes is between 3.5 and 5.5. Examinations of surface quality using a scanning electron microscope have shown an essentially smooth surface on tubular films made from regenerated cellulose using the NMMO process. Only isolated elevations are visible, while the distance between the highest and lowest points on the surface, in other words $R_{max}$, is greater than 0.1 μm, and in individual cases may be up to 0.5 μm. The average degree of roughness $R_m$ lies within the range of 0.005 to 0.014 μm. With a smooth surface of this type for a tubular film, an easy-peel preparation or a liquid smoke preparation can be reduced significantly or even omitted entirely; if the easy-peel preparation is omitted, the tubular film that has been plasticized with glycerin retains 8 to 12% by weight residual moisture after drying.

Figure 3:
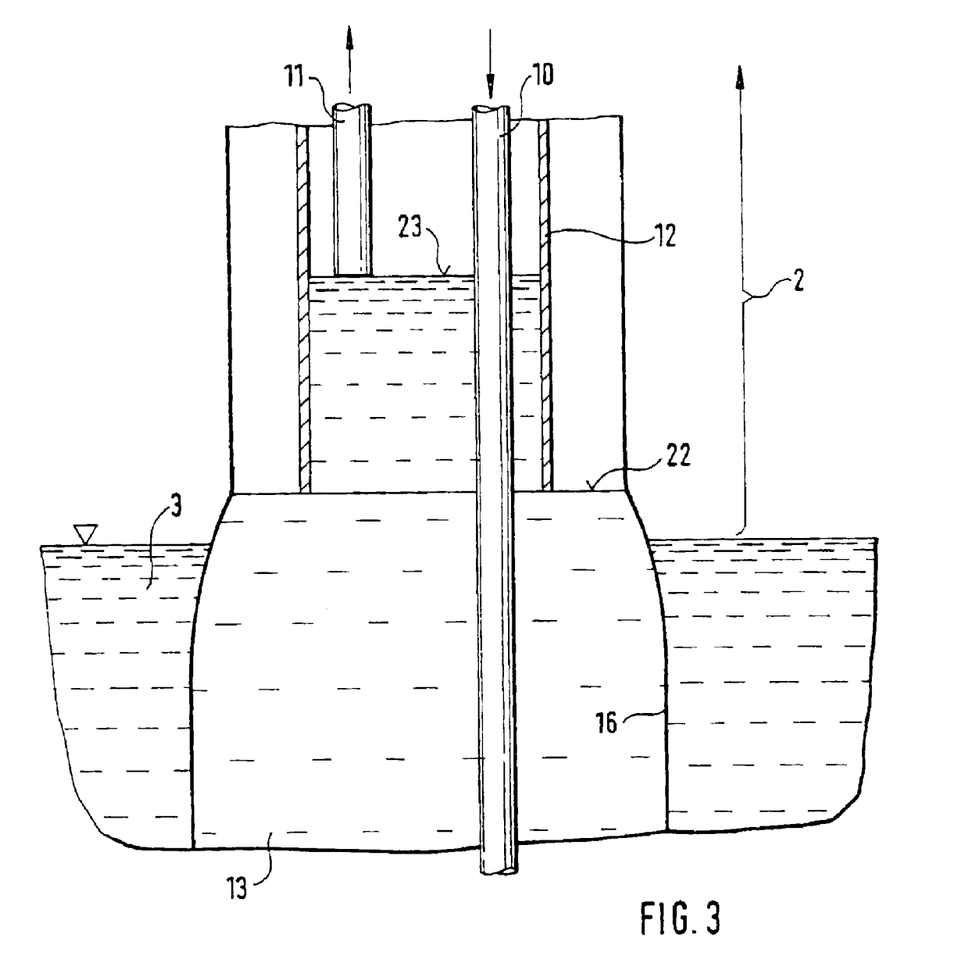
FIG. 3 is an enlarged sectional view of Point A indicated in FIG. 1.

FIG. 3 shows an enlarged sectional view of the area marked A in FIG. 1. The pipe 12 is positioned approximately 3 to 10 mm below the extrusion die 1 in the inner air passage 17. The outlet tube 11 is in a position in which a level 23 in the pipe 12 is established above the surface of the spinning bath 3 and above the level 22 of the inner spinning solution 13 in the tubular film 16. Thus, the removal begins above the surface of the spinning bath 3.

By adjusting the immersion depth of the inlet tube 10 and the constant renewal of the inner spinning solution to maintain a constant concentration and hence a constant density, it is ensured that with the appropriate concentration and density in the spinning bath 3, the tubular film 16 will progress with a constant extended diameter up to the turning point 15, and no uneven fluctuations in shape or size will occur. The height of the inner bath column and the constant renewal or minimum supply of inner bath solution is to be determined individually for each extrusion or discharge velocity of the tubular film 16.

The tubular film 16 exiting the spinning bath 3 subsequently traverses a washing vat that is not illustrated here, and may, for example, subsequently be treated with plasticizers and then dried, before it is rolled and further processed.

The following examples serve to describe the invention in greater detail. % ages contained herein are by weight unless otherwise indicated.

COMPARISON EXAMPLE 5 kg of powdered wood cellulose (sulfite pulp MoDo dissolving, Fa. MoDo) having an average degree of polymerization DP of 550, measured using the Cuoxam Method, were slurried into 51 kg of a 60-% NMMO solution. By adding NaOH, a pH value of 11 was achieved. Under conditions of heat and stirring, $H_2O$ was distilled off in a vacuum, at 25 mbar with increasing temperature, until an NMMO concentration of 87% was reached, relative to the total weight of the solvent (corresponds to a monohydrate of the NMMO). The solution was then stirred for 2 hours at a temperature of 90° C. and 200 mbar pressure, so that the pulp was completely dissolved. This solution possessed a refraction index of 1.4887.

The spinning solution produced in this manner was extruded at a temperature of 90° C. through an annular die having an opening diameter of 20 mm and an opening width of 0.5 mm. At a rate of 20 m/min, the tubular film first passed an air gap of 10 cm. In this gap the film became laterally drawn via compressed air. On the inside of the tube, an inner spinning solution that was constantly being renewed, composed of a 15-% NMMO solution which had been cooled to 5° C., was introduced. The tubular film then traversed a 3 m spinning bath section, with its direction being reversed at half the distance. The spinning bath contained a solution of the same composition and same concentration and temperature as the inner spinning solution. The tube was drawn laterally until its flattened width, after exiting the spinning vat, was 30 to 41 mm.

The tubular film then passed through four washing vats, each with 8 reversing rollers above and below, a bath depth of 1 m, and an air gap of 2 m. At the end of the last vat water was introduced, against the flow. At the point of exit for the first vat, the NMMO content was maintained at 12 to 16% in this manner. The temperature was increased to 60 to 70° C. in the last vat. Finally, the tube was directed through a plasticizing vat containing a 10-% glycerin solution at a temperature of 60° C.

Upon exiting the plasticizing vat, the flattened width of the tubular film was still 30 to 41 mm. The tube was then dried with hot air between two squeezing rollers. The drier was equipped with several zones of increasing temperature. The zone at the entrance had a temperature of 120° C., while that at the exit was 80° C. Afterward, the tube was moistened until its water content was 8 to 12% (relative to the weight of the cellulose). The cracking pressure of the tube was 52 kPa, its expansion value was 130%, and the maximum roughness of the inner surface of the tubular film was 1.0 μm. This tube exhibited flaws in the form of folds and creases at irregular intervals, which in part resulted in losses in air during the drying process, and in high production losses during the subsequent filling process.

The tube was then moistened to 16 to 18%, and was filled forming chains, wherein a portion was also equipped with an easy-peel preparation. The chains were filled with sausage filling using an automatic filling machine (FrankAMatic®), boiled, and cured. Afterward, the casing was peeled off using an automatic device. In this process, the chains that were not treated with the easy-peel preparation showed an unsatisfactory peeling, such that the sausages exited the peeling machine with casing still on them. With the easy-peel preparation, the peeling process was satisfactory.

Example 1

A spinning solution prepared was spun in accordance with the comparison example. In contrast with the comparison example, the extruded tubular film was treated with an inner spinning solution composed of 15-% NMMO solution that had been cooled to 5° C., which was introduced to the inside of the tube 5 cm above the spinning bath. The further treatment proceeded as indicated in the comparison example. The flattened width of the tube after it had exited the spinning vat measured 30 mm to 41 mm.

The sausage casing produced in this manner exhibited no folds, so that an outwardly perfect product was obtained over the entire production process, hence there were no problems of any kind during drying and filling. The cracking pressure was 55 kPa, the expansion value was 140%, and the maximum roughness was 1.15 μm. This sausage casing could not be automatically peeled without the easy-peel preparation. The peeling process with the easy-peel preparation was satisfactory.

Example 2

A spinning solution produced in accordance with the comparison example was spun in accordance with the comparison example. In contrast to the comparison example, the extruded tubular film was treated with an inner spinning solution composed of a 20-% NMMO solution that had been cooled to 15° C., and was introduced to the inside of the tube 5 cm above the spinning bath. The composition of the spinning bath was the same as that of the inner spinning solution. Further treatment proceeded as indicated in the comparison example.

The tubular film produced in this manner showed substantially no folds, so that an outwardly perfect product was obtained over the entire production length, and no problems of any kind occurred during drying and filling. The cracking pressure was 50 kPa, the expansion value was 125%, and the maximum roughness was 0.25 µm. This sausage casing could also be automatically peeled following boiling and curing without the easy-peel preparation.

The average roughness of the inner surfaces of the sausage casings in Examples 1 and 2 ranged from 5 to 14 nm. With decreasing maximum roughness, in the sausage casings specified in the invention, the easy-peel preparation can be reduced or even omitted.

All documents referred to herein are expressly incorporated by reference in their entireties.

As used herein, articles including "a", "an", and "the" can connote the singular or plural of the object that follows.

The priority document, German Patent application No. 100 35 798.9, filed Jul. 22, 2000 is expressly incorporated herein by reference in its entirety.

Additional advantages, features and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined bye the appended claims and their equivalents.

What is claimed is:

1. A method for producing a seamless tubular film based on a cellulose base comprising: extruding an aqueous cellulose-N-methyl-morpholine-N-oxide spinning solution through an annular die in a spinning bath, wherein the spinning solution forms said tubular film,
   laterally drawing said film in an air gap between said annular die and said spinning bath by stabilizing air pressure in said tubular film, wherein the level of hydrostatic pressure from an inner spinning solution formed inside said tubular film extends above said spinning bath, said inner spinning solution comprising an aqueous cellulose-N-methyl-morpholine-N-oxide solution that supports and intensifies said lateral drawing;
   passing the tubular film that has been expanded by the lateral drawing process by a turning point in the spinning bath, and
   directing said film out of said spinning bath.

2. A method of claim 1, wherein water-soluble compounds designed to modify the surface structure of the tubular film are added to the inner spinning solution in a ratio of 1 to 100% by weight based upon the weight of cellulose-N-methyl-morpholine-N-oxide.

3. A method of claim 2, wherein said water soluble compounds comprise at least one selected from the group consisting of synthetic polymers or copolymers of acrylic acid esters with acrylic acid, methacrylic acid esters with methacrylic acid, maleic acid esters with maleic acid, and acrylamide, methacrylamide, and vinyl alcohol.

4. A method of claim 2, wherein said water soluble compounds comprise at least on selected from the group consisting of citric acid, ascorbic acid, maltodextrin, sorbitol, manose, glucose, phophonate salts, inorganic salts, and gallic acid ester.

5. A method of claim 1, wherein the spinning bath and the inner spinning solution comprise the same aqueous cellulose-N-methyl-morpholine-N-oxide solution of 5 to 50% by weight cellulose-N-methyl-morpholine-N-oxide.

6. A method of claim 1, wherein the lateral drawing of the tubular film is conducted at least in part based on the ratio of the discharge velocity of the spinning bath from the spinning die to the drawing rate of the tubular film, such that the lateral drawing of the tubular diameter amounts to up to 30%, relative to the diameter of undrawn tubular film, measured immediately after the tubular film has exited the spinning die.

7. A method of claim 1, wherein the solution of the inner spinning solution is supplied and removed through said annular die, and wherein the supplying and removal area accomplished through separate pathways.

8. A method of claim 7, further comprising removing the solution in the inner spinning solution through an outlet tube inside a pipe, and wherein an outlet opening of the outlet tube is positioned at the same height as the inner spinning solution in the tubular film.

9. A method of claim 8, further comprising regulating the supply of the solution of the inner spinning solution by adjusting the height of said solution within the tubular film that is immersed in the spinning bath, and wherein the outlet opening of the outlet tube is positioned 30 to 60 mm above the spinning bath.

10. A method of claim 1, wherein the drawn tubular film is immersed in the spinning bath, perpendicular to the surface of the spinning bath, such that said tubular film traverses the spinning bath with a constantly expanded diameter up to said turning point, and is turned in an expanded state; and wherein after the point, said tubular film is essentially free from folds and is directed upward, out of the spinning bath, at an angle of 10 to 80° from horizontal.

11. A method of claim 1, wherein the cellulose-N-methyl-morpholine-N-oxide concentration of the spinning bath and that of the inner spinning solution are initially the same, and wherein renewal of the inner spinning solution counters any increase in cellulose-N-methyl-morpholine-N-oxide concentration in the inner spinning solution as the tubular film moves toward the turning point, such that the cellulose-N-methyl-morpholine-N-oxide concentration of said spinning bath is maintained at the same or less than the initial concentration.

12. A method of claim 1, further comprising heating the annular die to a temperature of 85 to 105° C.

13. A method of claim 1, wherein one or more modifying compounds are added to the spinning solution in an amount of 0.2 to 50% by weight based upon the weight of the cellulose.

14. A method of claim 13, wherein the one or more modifying compounds are intended to modify the inner structure of the tubular film and are at least one selected from the group consisting of starches, cellulose, starches or cellulose derivatives, sugar esters, alginic acid or alginate, chitosan, carrageenan, vinyl alcohol, polyvinyl pyrrolidone, copolymers of vinyl pyrrolidone and 2-dimethoylaminoethyl-methacrylate, copolymers of methylvinyl ether and maleic acid anhydride, or copolymers of methylvinylether and maleic acid monoalkylesters.

15. A method of claim 13, wherein the one or more modifying compounds comprise surface-altering additives are at least one selected from the group consisting of beeswax, carboxymethyl starches, cellulose carbamate, gelatins, xanthan, carboxymethylcellulose, glycerin-monolaurate, Na-caseinate, cellulose acetate, wheat protein, soy protein, derivatives of mono-, di-, or oligosaccharides, especially esters from sugar and fatty acids, mono-, di-, and triglycerides, diketenes having generally straight-chain, saturated ($C_{14}$–$C_{20}$) alkyl residues waxes, and/or paraffins.

16. A seamless tubular film comprising cellulose, wherein the average degree of polymerization DP of the cellulose is 300 to 700, said film having been produced by extruding an aqueous cellulose-N-methyl-morpholine-N-oxide spinning solution, wherein said tubular film possesses a maximum degree of roughness $R_{max}$ that is from greater than 0.1 μm to 0.5 μm, and an average degree of roughness $R_m$ of 0.005 to 0.014 μm, and is provided with an easy-peel preparation, on the inner surface of the tubular film, said easy-peel preparation comprising carboxymethylcellulose, sorbitol-triolcate, a mixture of mono- and diglycerides and water.

17. A seamless tubular film of claim 16, wherein an electric charge density forms on the surface of the tubular film when it comes in contact with an electrolyte; said electric charge density corresponding to an electrokinetic potential, the $\zeta$-potential, which measures −15 to −25 mV if the pH value of the electrolyte is between 6 and 10.5, and measures +5 to −15 mV if the pH value of the electrolyte is between 3.5 and 5.5.

18. A seamless tubular film of claim 16, wherein the tubular film is plasticized with glycerin and is impregnated on its inner surface with an easy-peel preparation comprising of 1 to 2% by weight carboxymethylcellulose, 0.5 to 1.5% by weight sorbitol-trioleate based upon carboxymethylcellulose, 0.5 to 1% by weight of a mixture of mono- and diglycerides, and balance is water.

19. A seamless tubular film of claim 16 or 18, wherein the tubular film that has been plasticized with glycerin is provided on an inner surface thereof with a liquid smoke preparation comprising of 35 to 39% by weight liquid smoke, 1 to 10% by weight lecithin, 3 to 5% by weight of one or more components selected from the group consisting of NaOH, 1.5 to 2% by weight alginate, 2 to 3% by weight polyethylene glycol-monoalkyl either, and 1 to 2% by weight chromic fatty acid complex with $C_{14}$–$C_{18}$ alkyl residues, and the balance is water.

20. A seamless tubular film of claim 16, that has been plasticized with glycerin and exhibits a residual moisture of 8 to 12% by weight and is not provided with an easy-peel preparation thereon.

* * * * *